(12) United States Patent
Hoshino et al.

(10) Patent No.: US 10,447,183 B2
(45) Date of Patent: Oct. 15, 2019

(54) MOTOR DRIVE DEVICE

(71) Applicant: Hitachi Automotive Systems, Ltd., Hitachinaka-shi, Ibaraki (JP)

(72) Inventors: Katsuhiro Hoshino, Hitachinaka (JP); Shingo Nishiguchi, Hitachinaka (JP); Toshisada Mitsui, Hitachinaka (JP); Kazuto Oyama, Hitachinaka (JP); Hideki Miyazaki, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/321,931

(22) PCT Filed: Jun. 24, 2015

(86) PCT No.: PCT/JP2015/068117

§ 371 (c)(1),
(2) Date: Dec. 23, 2016

(87) PCT Pub. No.: WO2015/199104

PCT Pub. Date: Dec. 30, 2015

(65) Prior Publication Data

US 2017/0133958 A1 May 11, 2017

(30) Foreign Application Priority Data

Jun. 26, 2014 (JP) ................................ 2014-131567

(51) Int. Cl.
*H02P 6/10* (2006.01)
*H02P 27/06* (2006.01)
*H02P 25/22* (2006.01)

(52) U.S. Cl.
CPC ................ *H02P 6/10* (2013.01); *H02P 27/06* (2013.01); *H02P 25/22* (2013.01)

(58) Field of Classification Search
CPC .................................. H02P 6/10; H02P 27/06
(Continued)

(56) References Cited

U.S. PATENT DOCUMENTS 8,653,797 B2 * 2/2014 Cullen ..................... H02K 3/28
318/700
2008/0067960 A1 * 3/2008 Maeda ................... B62D 5/046
318/400.02
(Continued)

FOREIGN PATENT DOCUMENTS

EP 2 043 256 A2 4/2009
JP 2006-149146 A 6/2006
(Continued)

OTHER PUBLICATIONS

International Search Report (PCT/ISA/210) issued in PCT Application No. PCT/JP2015/068117 dated Aug. 11, 2015 with English-language translation (two (2) pages).
(Continued)

*Primary Examiner* — Bickey Dhakal
*Assistant Examiner* — Devon A Joseph
(74) *Attorney, Agent, or Firm* — Crowell & Moring LLP

(57) ABSTRACT

A motor is driven while suppressing drive torque ripple generated by the motor, when any of the phases is opened during the driving of the motor. A motor drive device controls the driving of a motor in which the armature windings of respective phases are independently provided. The motor drive device is equipped with: an inverter circuit for converting the DC power supplied through DC bus lines to three-phase AC powers and respectively outputting the three-phase AC powers to the armature windings of the respective phases; and a controller for controlling the inverter circuit. When any of the phases is opened in the AC powers output from the inverter circuit, the controller adjusts the difference between the phases of the respective currents flowing through the armature windings of normal phases so that the AC powers of the other normal phases except the opened phase are compensated each other.

6 Claims, 18 Drawing Sheets

(58) Field of Classification Search
USPC .......................................................... 318/496
See application file for complete search history.

(56) References Cited

U.S. PATENT DOCUMENTS

| | | | |
|---|---|---|---|
| 2009/0079371 A1* | 3/2009 | Suzuki .................... | H02P 21/16 318/400.02 |
| 2011/0080000 A1* | 4/2011 | Cullen .................... | H02K 3/28 290/31 |

FOREIGN PATENT DOCUMENTS

| | | | |
|---|---|---|---|
| JP | 2010-167881 A | 8/2010 | |
| WO | WO 2010/004239 A1 | 1/2010 | |

OTHER PUBLICATIONS

Japanese-language Written Opinion (PCT/ISA/237) issued in PCT Application No. PCT/JP2015/068117 dated Aug. 11, 2015 (three (3) pages).
Extended European Search Report issued in counterpart European Application No. 15812091.5 dated Feb. 21, 2018 (eight (8) pages). Cover page of EP 2 286 510 A1 published Feb. 23, 2011 with English Abstract.

* cited by examiner

ELECTRICAL ANGLE [deg.]

ELECTRICAL ANGLE [deg.]

← DIRECTION OF CURRENT

← DIRECTION OF CURRENT

MOTOR DRIVE DEVICE

TECHNICAL FIELD

The present invention relates to a motor drive device.

BACKGROUND ART

Conventionally, devices, which perform drive control of an independent winding multi-phase motor (for example, a six-line three-phase motor) capable of controlling current of an armature winding of each phase provided in a motor stator independently from each other, have been known. When such a motor is used, it is possible to solve a lack in voltage without using a booster circuit and to acquire higher output of the motor. In addition, it is possible to increase capacity and to increase a maximum rotational velocity.

A technique has been proposed in which a pseudo-square wave current, obtained by superimposing a harmonic component on a winding of each phase, is caused to flow in an independent winding multi-phase motor as described above so as to enable drive of a motor to continue even when a current or a voltage is abnormal in a winding of any phase (PTL1).

CITATION LIST

Patent Literature

PTL1: Japanese Patent Application Laid-Open No. 2006-149146

SUMMARY OF INVENTION

Technical Problem

In the technique described in PTL1, the drive of the motor may continue when the abnormality is caused in a winding of any phase, but it is difficult to control pulsation of a drive torque generated by the motor.

The present invention has been made in order to solve the problems of the related art described above. A main object thereof is to provide a motor drive device to control drive of an independent winding multi-phase motor that is capable of continuing the drive of the motor while suppressing pulsation of a drive torque generated by the motor when any phase becomes an open phase during the drive of the motor.

Solution to Problem

A motor drive device according to the present invention is configured to control drive of a multi-phase motor in which armature windings of respective phases are provided to be independent from each other, and is provided with: an inverter circuit, which converts a DC power supplied via a DC bus line into a multi-phase AC power and outputs the converted power to each of the armature windings of the respective phases; and a controller configured to control the inverter circuit, in which when any open phase occurs in the AC power, the controller adjusts a phase difference of each current flowing in the armature windings of normal phases such that the respective AC powers of the normal phases other than the open phase offset each other.

Advantageous Effects of Invention

According to the present invention, it is possible to provide the motor drive device to control the drive of the independent winding multi-phase motor that is capable of continuing the drive of the motor while suppressing the pulsation of the drive torque generated by the motor when any phase becomes the open phase during the drive of the motor.

DESCRIPTION OF EMBODIMENTS

First Embodiment

Figure 1:
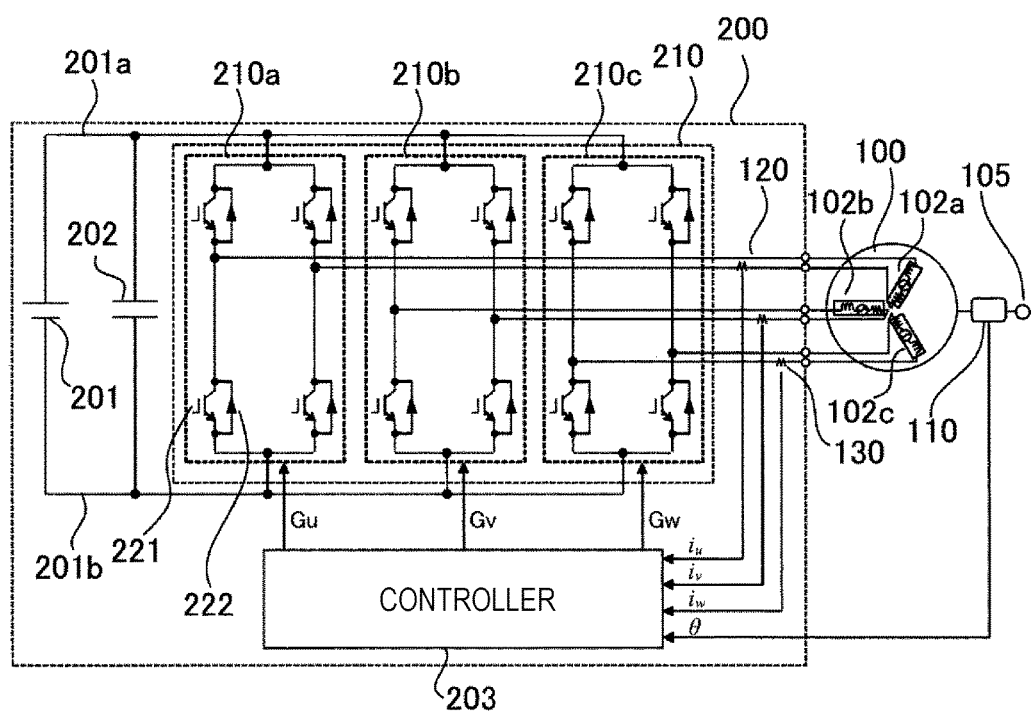
FIG. 1 is a diagram illustrating a configuration of a motor drive device according to a first embodiment of the present invention.

FIG. 1 is a diagram illustrating a configuration of a motor drive device 200 according to a first embodiment of the present invention. The motor drive device 200 is connected to a motor 100, which is used in a hybrid electric vehicle (HEV), an electric vehicle (EV) or the like, and controls drive of the motor 100. The motor drive device 200 includes a DC power supply 201, a smoothing capacitor 202, a controller 203, and an inverter circuit 210.

The motor 100 is a six-line three-phase AC motor of an independent winding type which includes three-phase armature windings 102a, 102b and 102c which respond to a U-phase, a V-phase and a W-phase, respectively. These armature windings 102a to 102c are provided to be independent from each other. The motor drive device 200 can drive the motor 100 by independently controlling each current flowing in the armature windings 102a to 102c. A magnetic pole position detector 110, which detects a magnetic pole position θ of the motor 100, is attached to an output shaft 105 of the motor 100. A detection result of the magnetic pole position θ obtained by the magnetic pole position detector 110 is output to the controller 203.

The DC power supply 201 supplies a DC power to the inverter circuit 210 via DC bus lines 201a and 201b. It is possible to use a secondary battery such as a lithium ion battery, or the like for the DC power supply 201.

The smoothing capacitor 202 is configured to control a variation in DC voltage caused depending on an operation of the inverter circuit 210, and is connected between the DC bus line 201a and the DC bus line 201b to be parallel with the inverter circuit 210.

The controller 203 outputs drive signals Gu, Gv and Gw, respectively, to bridge circuits 210a, 210b and 210c of the respective phases included in the inverter circuit 210. The controller 203 can control the inverter circuit 210 by operating the bridge circuits 210a, 210b and 210c according to the drive signals Gu, Gv and Gw.

The inverter circuit 210 includes the full-bridge type bridge circuit 210a, 210b and 210c which respond to the U-phase, the V-phase, and the W-phase, respectively. Each of the bridge circuits 210a, 210b and 210c includes four IGBTs 221 functioning as switching elements of respective upper and lower arms, and four diodes 222 provided to be parallel with the respective IGBTs 221. Each of the IGBTs 221 performs a switching operation according to the drive signals Gu, Gv and Gw from the controller 203 in the bridge circuits 210a, 210b and 210c. Accordingly, the DC power supplied from the DC power supply 201 is converted into a three-phase AC power, and the converted power is output to the armature windings 102a, 102b and 102c of the respective phases of the motor 100 via AC output lines 120 of the respective phases from the bridge circuits 210a, 210b and 210c.

An AC sensor 130, which is configured to detect each current flowing in the armature windings 102a, 102b and 102c of the motor 100, is provided to each of the AC output lines 120 of the respective phases. Current values $i_u$, $i_v$ and $i_w$ of the respective phases each phase, detected by the AC sensor 130, are output to the controller 203. The controller 203 performs a predetermined current control operation based on the current values $i_u$, $i_v$ and $i_w$ of the respective phases input from the AC sensor 130, and the magnetic pole position θ input from the magnetic pole position detector 110, and outputs the drive signals Gu, Gv and Gw of the respective phases based on a result of the operation.

Figure 2:
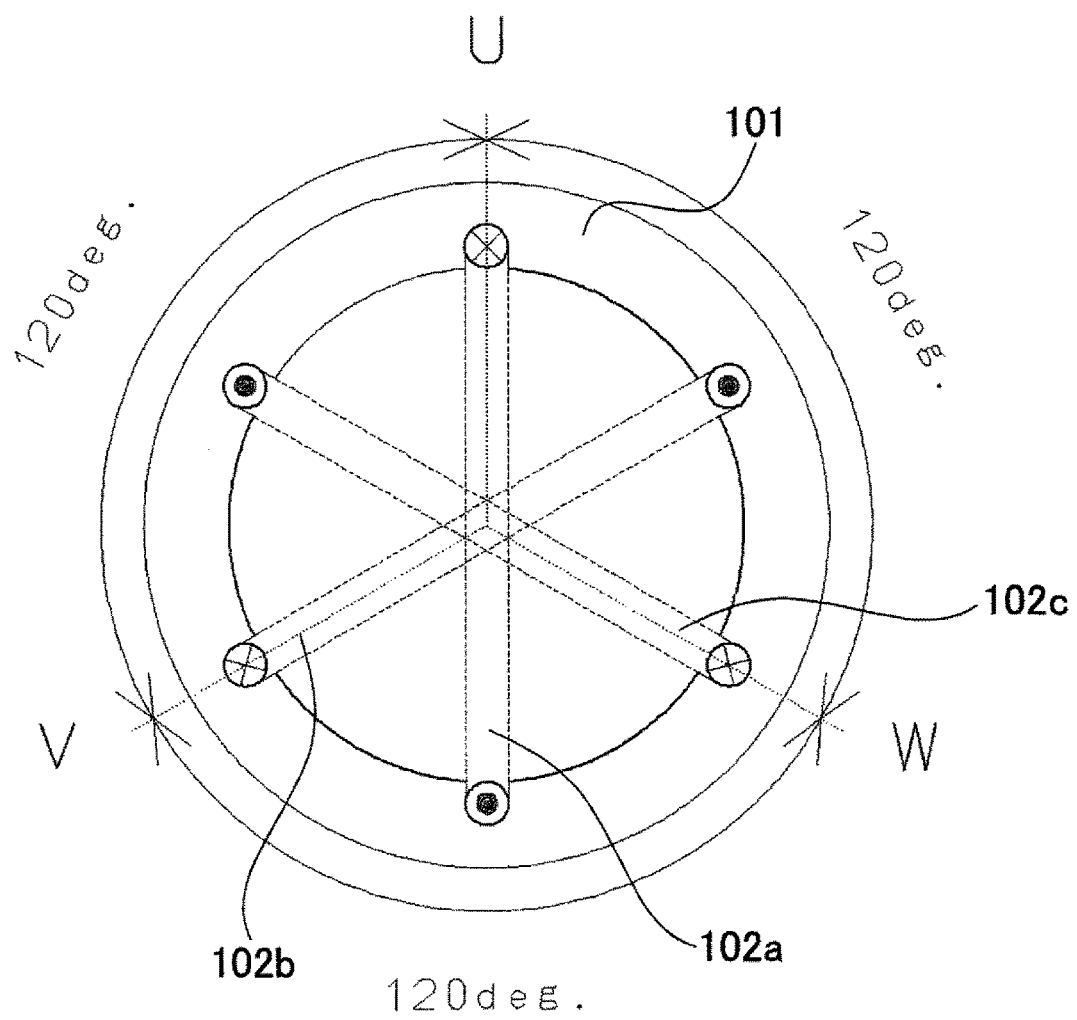
FIG. 2 is a diagram illustrating an arrangement example of an armature winding of a motor.

FIG. 2 is a diagram illustrating an arrangement example of the armature windings 102a, 102b and 102c in the motor 100. As illustrated in FIG. 2, the armature windings 102a, 102b and 102c are arranged in a stator of the motor 100 to be mechanically shifted each by 120° such that each phase difference of waveforms of the induced voltages of the respective phases becomes 120° based on an electrical angle. Incidentally, the armature windings 102a, 102b and 102c are provided to be independent from each other in the motor 100 as described above, which is different from a structure of Y-connection or Δ-connection in general three-phase equilibrium motors of the related art.

Figure 3:
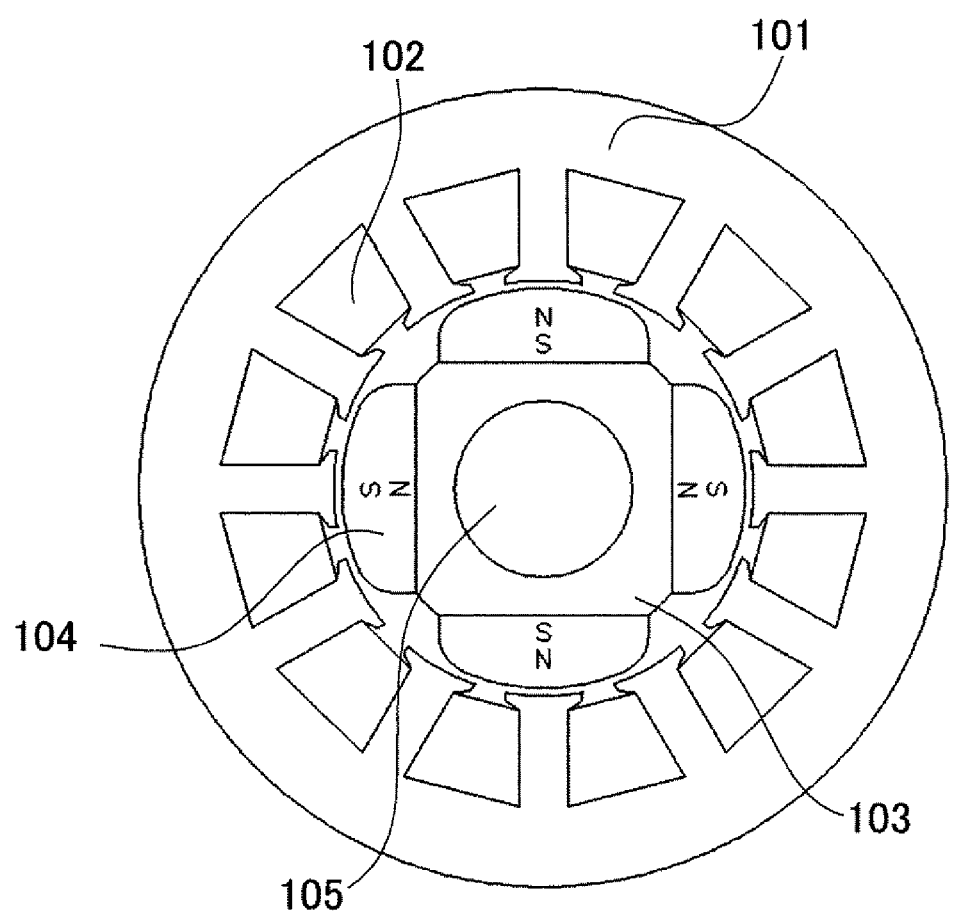
FIG. 3 is a diagram illustrating an example of a structure of the motor.

FIG. 3 is a diagram illustrating an example of a structure of the motor 100. As illustrated in FIG. 3, for example, the motor 100 is a surface magnet motor which is configured of a stator core 101 to which a plurality of armature windings 102 are attached and a rotor core 103 which is fixed to the output shaft 105 and has a surface to which a plurality of permanent magnets 104 are pasted. Incidentally, each of the armature windings 102 corresponds to any of the armature windings 102a, 102b and 102c in FIG. 2.

Figure 4:
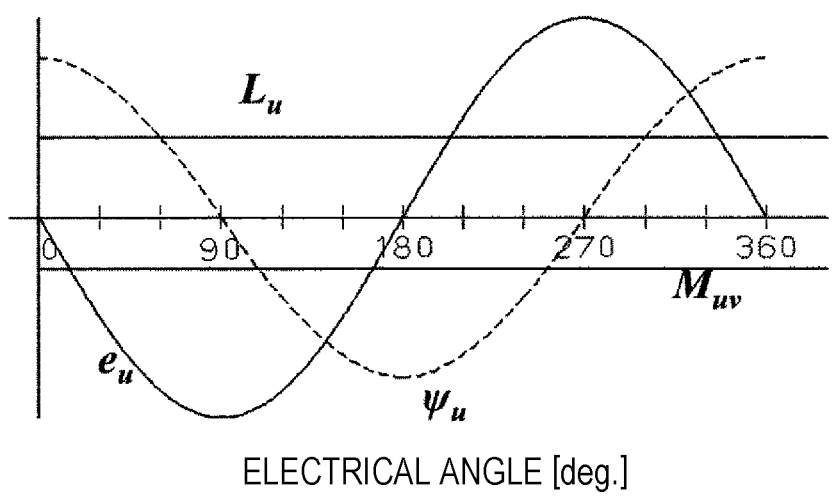
FIG. 4 is a diagram illustrating each aspect of changes of an interlinkage magnetic flux, an induced voltage, and an inductance in the motor having the structure illustrated in FIG. 3.

FIG. 4 is a diagram illustrating each aspect of changes of an interlinkage magnetic flux, an induced voltage, and an inductance in the motor 100 having the structure illustrated in FIG. 3. When an interlinkage magnetic flux, an induced voltage, and a self-inductance of the U-phase are set to $\psi_u$, $e_u$ and $L_u$, respectively, and a mutual inductance between the U-phase and the V-phase is set to $M_{uv}$, these are changed as illustrated in FIG. 4, for example, depending on the electrical angle of the motor 100. That is, the interlinkage magnetic flux $\psi_u$ and the induced voltage $e_u$ are periodically changed having an electrical angle of 360° as a single period. On the other hand, the self-inductance $L_u$ and the mutual inductance $M_{uv}$ are constant regardless of the electrical angle in the structure of FIG. 3. Incidentally, the same description is also applied regarding the V-phase and the W-phase.

Figure 5:
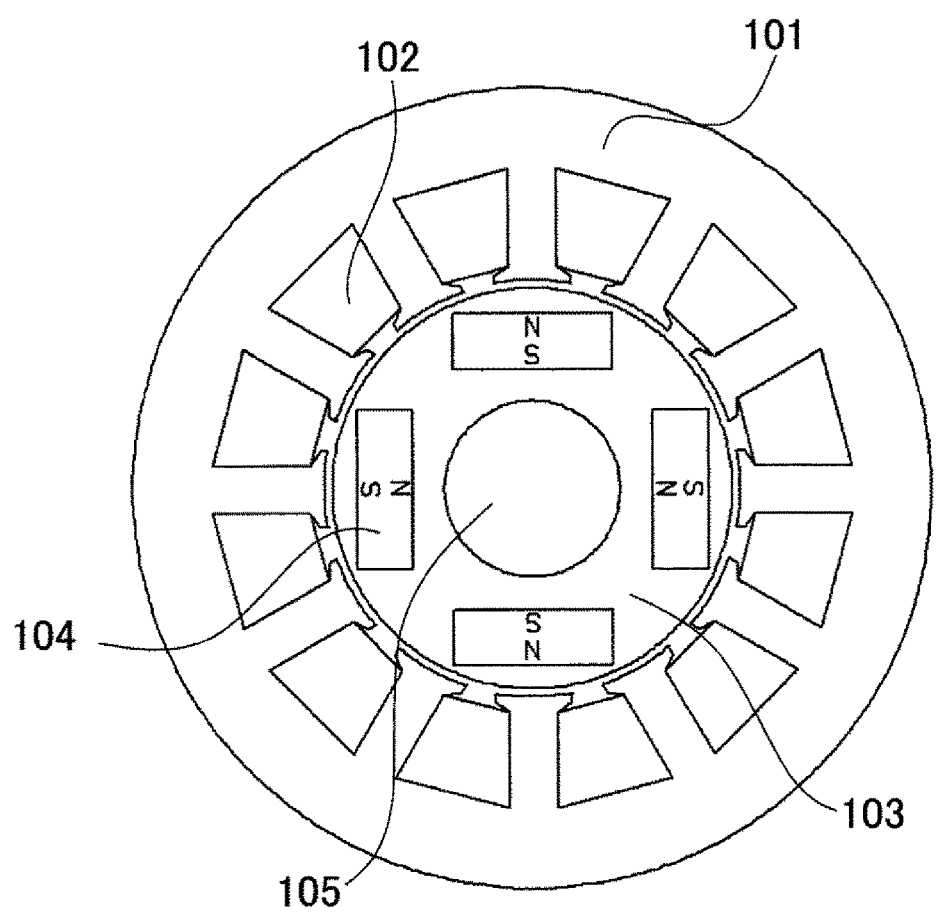
FIG. 5 is a diagram illustrating another example of the structure of the motor.

FIG. 5 is a diagram illustrating another example of the structure of the motor 100. As illustrated in FIG. 5, for example, the motor 100 is an embedded magnet motor which is configured of the stator core 101 to which the plurality of armature windings 102 are attached, similar to FIG. 3, and the rotor core 103 which is fixed to the output shaft 105 and has the plurality of permanent magnets 104 are embedded therein.

Figure 6:
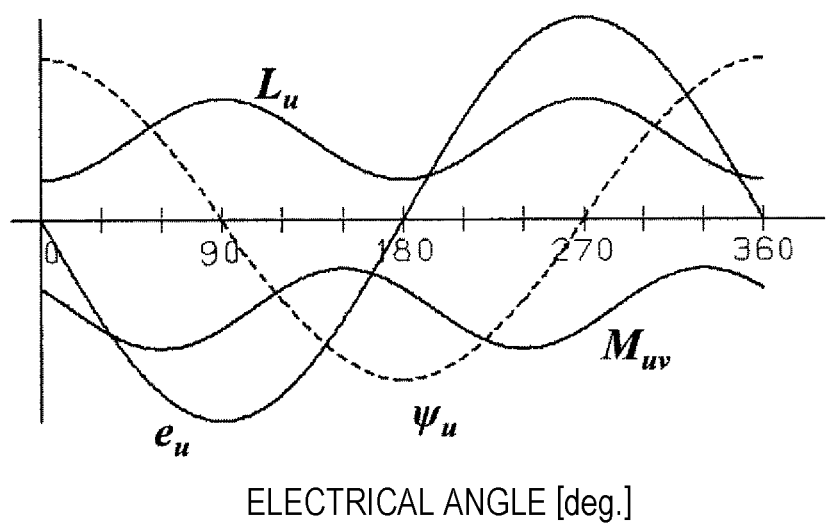
FIG. 6 is a diagram illustrating each aspect of changes of the interlinkage magnetic flux, the induced voltage, and the inductance in the motor having the structure illustrated in FIG. 5.

FIG. 6 is a diagram illustrating each aspect of changes of an interlinkage magnetic flux, an induced voltage, and an inductance in the motor 100 having the structure illustrated in FIG. 5. When the interlinkage magnetic flux, the induced voltage, and the self-inductance of the U-phase are set to $\psi_u$, $e_u$ and $L_u$, respectively, and the mutual inductance between the U-phase and the V-phase is set to $M_{uv}$, these are changed as illustrated in FIG. 6, for example, depending on the electrical angle of the motor 100. That is, the interlinkage magnetic flux $\psi_u$ and the induced voltage $e_u$ are periodically changed having an electrical angle of 360° as a single period. On the other hand, the self-inductance $L_u$ and the mutual inductance $M_{uv}$ are periodically changes having an electrical angle of 360° as two periods (that is, having an electrical angle of 180° as a single period) in the structure of FIG. 5. Incidentally, the same description is also applied regarding the V-phase and the W-phase.

A voltage equation of the motor 100, which employs the permanent magnet illustrated in FIG. 3 or 5, is expressed by the following Formula (1).

[Formula 1]

$$\begin{bmatrix} v_u \\ v_v \\ v_w \end{bmatrix} = R \begin{bmatrix} i_u \\ i_v \\ i_w \end{bmatrix} + p \begin{bmatrix} L_u & M_{uv} & M_{wu} \\ M_{vu} & L_v & M_{vw} \\ M_{wu} & M_{vw} & L_w \end{bmatrix} \begin{bmatrix} i_u \\ i_v \\ i_w \end{bmatrix} + \begin{bmatrix} e_u \\ e_v \\ e_w \end{bmatrix} \quad (1)$$

In the above-described Formula (1), $v_u$, $v_v$, $V_w$, $i_u$, $i_v$, and $i_w$ represent each voltage and current of the U-phase, the V-phase, and the W-phase, R represents a winding resistance for one phase, and P represents a differential operator. In addition, the induced voltages $e_u$, $e_v$ and $e_w$ of the respective phases, the self-inductances $L_u$, $L_v$ and $L_w$ of the respective phases, the mutual inductances $M_{uv}$, $M_{vw}$ and $M_{wu}$ among the respective phases in Formula (1) are represented by the following Formulae (2), (3) and (4), respectively.

[Formula 2]

$$\begin{bmatrix} e_u \\ e_v \\ e_w \end{bmatrix} = \begin{bmatrix} -\omega_e \psi_m \sin(\theta) \\ -\omega_e \psi_m \sin\left(\theta - \frac{2\pi}{3}\right) \\ -\omega_e \psi_m \sin\left(\theta + \frac{2\pi}{3}\right) \end{bmatrix} \quad (2)$$

[Formula 3]

$$\left. \begin{array}{l} L_u = l_a + L_a + L_{as}\cos(2\theta) \\ L_v = l_a + L_a + L_{as}\cos\left(2\theta + \frac{2\pi}{3}\right) \\ L_w = l_a + L_a + L_{as}\cos\left(2\theta - \frac{2\pi}{3}\right) \end{array} \right\} \quad (3)$$

[Formula 4]

$$\left. \begin{array}{l} M_{uv} = -\frac{1}{2}L_a - L_{as}\cos\left(2\theta - \frac{2\pi}{3}\right) \\ M_{vw} = -\frac{1}{2}L_a - L_{as}\cos(2\theta) \\ M_{wu} = -\frac{1}{2}L_a - L_{as}\cos\left(2\theta + \frac{2\pi}{3}\right) \end{array} \right\} \quad (4)$$

In Formula (2), $\omega_e$ represents an electrical angular velocity of the motor 100, and $\psi_m$ represents a winding interlinkage magnetic flux of the permanent magnet 104. In addition, la represents a leakage inductance for one phase in Formula (3), and $L_a$ and $L_{as}$ represent an average value component and an amplitude component, respectively, of an effective inductance for one phase in Formulae (3) and (4).

Incidentally, $L_{as}$=0 in Formulae (3) and (4) in the case of the surface magnet motor as illustrated in FIG. 3. On the other hand, $L_{as}$≠0 in Formulae (3) and (4) in the case of the embedded magnet motor as illustrated in FIG. 5.

A shaft torque T to be output from the motor 100 to the output shaft 105 is expressed by the following Formula (5). In Formula (5), $P_{OUT}$ represents mechanical energy (shaft output) output from the motor 100 to the output shaft 105, and $\omega_m$ represents a rotation angular velocity (shaft rotational velocity) of the output shaft 105. That is, the shaft torque T is a value obtained by dividing the shaft output $P_{OUT}$ by the shaft rotational velocity $\omega_m$. Thus, when the shaft rotational velocity $\omega_m$ and the motor the shaft output $P_{OUT}$ are constant values, the shaft torque T also becomes a constant value. Incidentally, calculation is performed by setting the number of pole pairs of the motor 100 to 1, and $\omega_e = \omega_m$ in Formula (5) in order to simplify the calculation, and relation of $\omega_m = \omega_e/P_p$ is established in practice when the number of pole pairs of the motor 100 is set to $P_p$.

[Formula 5]

$$T = \frac{P_{OUT}}{\omega_m} = \frac{P_{OUT}}{\omega_e} = \frac{P_{OUT}}{2\pi/f_e} \quad (5)$$

The shaft output $P_{OUT}$ of the motor 100 in the above-described Formula (5) is expressed by the following Formula (6).

[Formula 6]

$$P_{OUT} = P_u + P_v + P_w = e_u \cdot i_u + e_v \cdot i_v + e_w \cdot i_w \quad (6)$$

Incidentally, the shaft output $P_{OUT}$ expressed by Formula (6) is equal to a value that is obtained by subtracting each loss such as a copper loss and an iron loss from an input power $P_{IN}$ of the motor 100. The input power $P_{IN}$ of the motor 100 is sought as a value obtained by adding respective products between the instantaneous voltages $v_u$, $v_v$ and $v_w$ and the instantaneous currents $i_u$, $i_v$ and $i_w$ of the respective phases as illustrated in the following Formula (7).

[Formula 7]

$$P_{IN} = v_u \cdot i_u + v_v \cdot i_v + v_w \cdot i_w \quad (7)$$

Powers $P_u$, $P_v$ and $P_w$, determined based on the respective products between the induced voltages $e_u$, $e_v$ and $e_w$ and the instantaneous currents $i_u$, $i_v$ and $i_w$ of the respective phases, in the input power $P_{IN}$ are mainly converted into the shaft output $P_{OUT}$ in the surface magnet motor or the embedded magnet motor having a relatively small salient pole ratio as illustrated in Formula (6)

As apparent from Formula (5), the shaft output $P_{OUT}$ is a constant value when the motor 100 rotates at the constant shaft rotational velocity $\omega_m$, the shaft torque T becomes constant. As apparent from Formula (6), a sum of the powers $P_u$, $P_v$ and $P_w$ of the input power $P_{IN}$, determined by the respective products between the induced voltages $e_u$, $e_v$ and $e_w$ and the instantaneous currents $i_u$, $i_v$ and $i_w$ of the respective phases as described above, needs to be constant in order to set the shaft output $P_{OUT}$ of the motor 100 to be constant.

Figure 7:
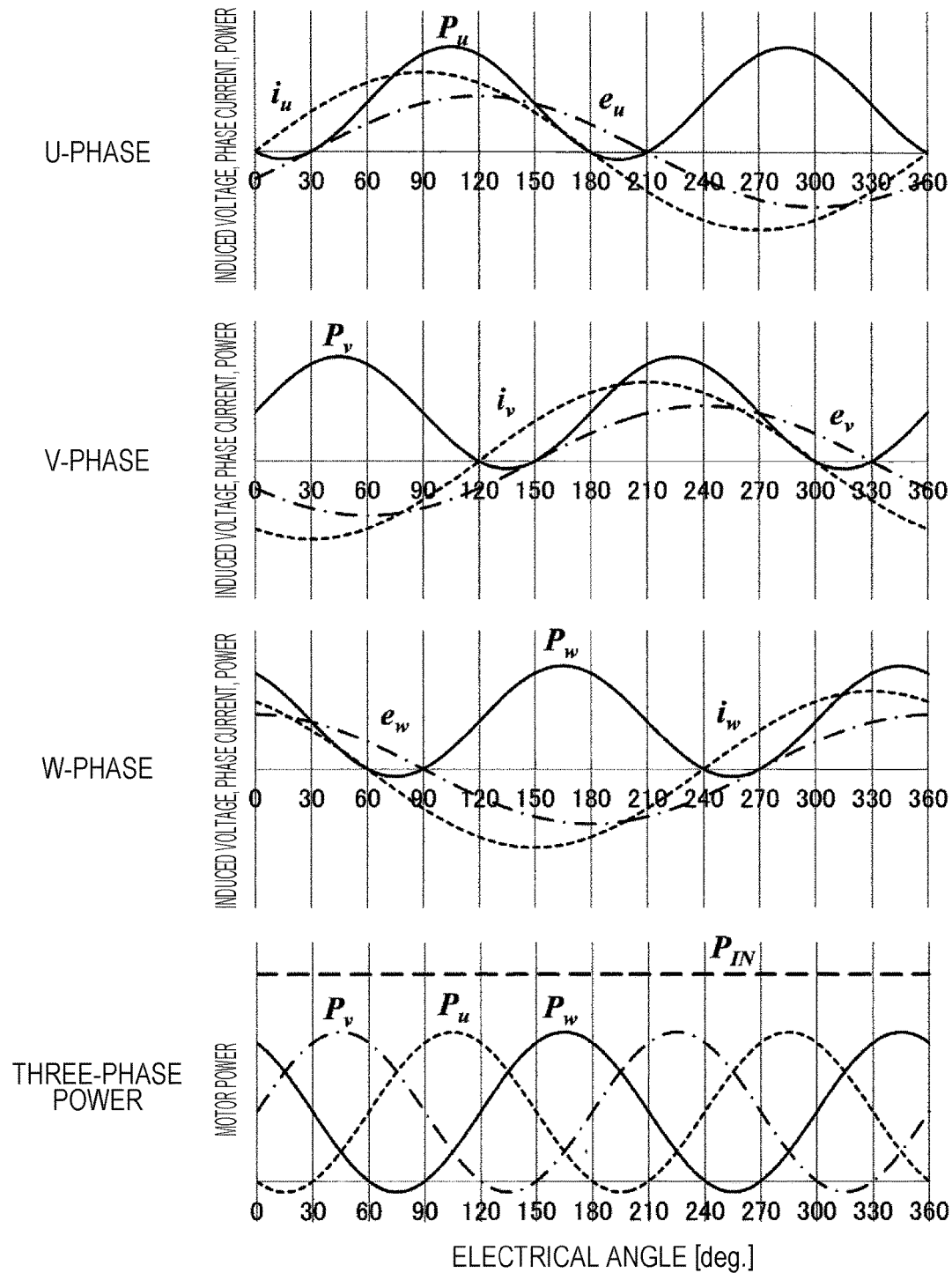
FIG. 7 is a diagram illustrating each waveform example of an induced voltage, a current, and a power of each phase in the motor in a normal state.

FIG. 7 is a diagram illustrating each waveform example of the induced voltage, the current, and the power of each phase in the motor 100 in a normal state. As described above, each phase difference of the induced voltages $e_u$, $e_v$ and $e_w$ of the respective phases caused in the armature windings 102a, 102b and 102c is 120°. In the normal state, the motor drive device 200 determines an operation timing of the IGBT 221 in each of the bridge circuits 210a, 210b and 210c such that the currents $i_u$, $i_v$ and $i_w$ of the respective phases flowing in the armature windings 102a, 102b and 102c have the phase differences by 120° from each other as illustrated in FIG. 7. As a result, the powers $P_u$, $P_v$ and $P_w$ of the respective phases, obtained based on the product between the induced voltage and the current, pulsate at a frequency, which is twice of each frequency of the induced voltage and the current, and have each phase difference of 60° as illustrated in FIG. 7. Meanwhile, the input power $P_{IN}$ which is the sum of the powers $P_u$, $P_v$ and $P_w$ of the three phases becomes constant as illustrated in FIG. 7. Therefore, it is understood that a torque pulsation is not generated in principle as long as the induced voltage and the current sine waves.

Incidentally, it is assumed that the induced voltage waveform and the current waveform are the ideal sine waves in the above description, but in practice, the induced voltage waveform or the current waveform includes some harmonic waves and is not the ideal sine wave. However, the motor drive device 200 can operate the motor 100 mostly without any problem even in this case by controlling the motor 100 while dealing the induced voltage waveform or the current waveform as the sine wave.

As described above, it is possible to cause the motor 100 to rotate while generating a constant torque by creating a state in which three phase currents are equilibrated also in the independent winding motor 100 which is capable of independently controlling each current flowing in the armature windings 102a, 102b and 102c of the respective phases. This principle is established for an independent winding multi-phase motor other than the three-phase motor. That is, when the number of phases of the motor is set to n, it is possible to cause the respective phase currents to be equilibrated by shifting each phase of the respective phase currents by 360/n°, and to cause the motor to rotate with a constant torque.

The motor drive device 200 in the normal state can control the torque of the motor 100 and rotationally drive the motor 100 the motor 100 by energizing the entire phase of the motor 100. However, it is difficult to suitably control the torque of the motor 100 using the same control method at the normal state when any phase is lost and is incapable of being energized as an abnormality occurs in the operation of the IGBT 221 in any of the bridge circuits 210a, 210b and 210c or an abnormality such as disconnection occurs in the AC output line 120 or a wiring inside the motor 100 in any phase, for example. That is, when any phase is lost in the AC power to be output from the inverter circuit 210 to each of the armature windings 102a, 102b and 102c of the motor 100, a significant torque pulsation is caused in the motor 100 if the current control is performed by shifting each phase of the currents $i_u$, $i_v$ and $i_w$ of the respective phases by 120° in the same manner as in the normal state.

Figure 8:
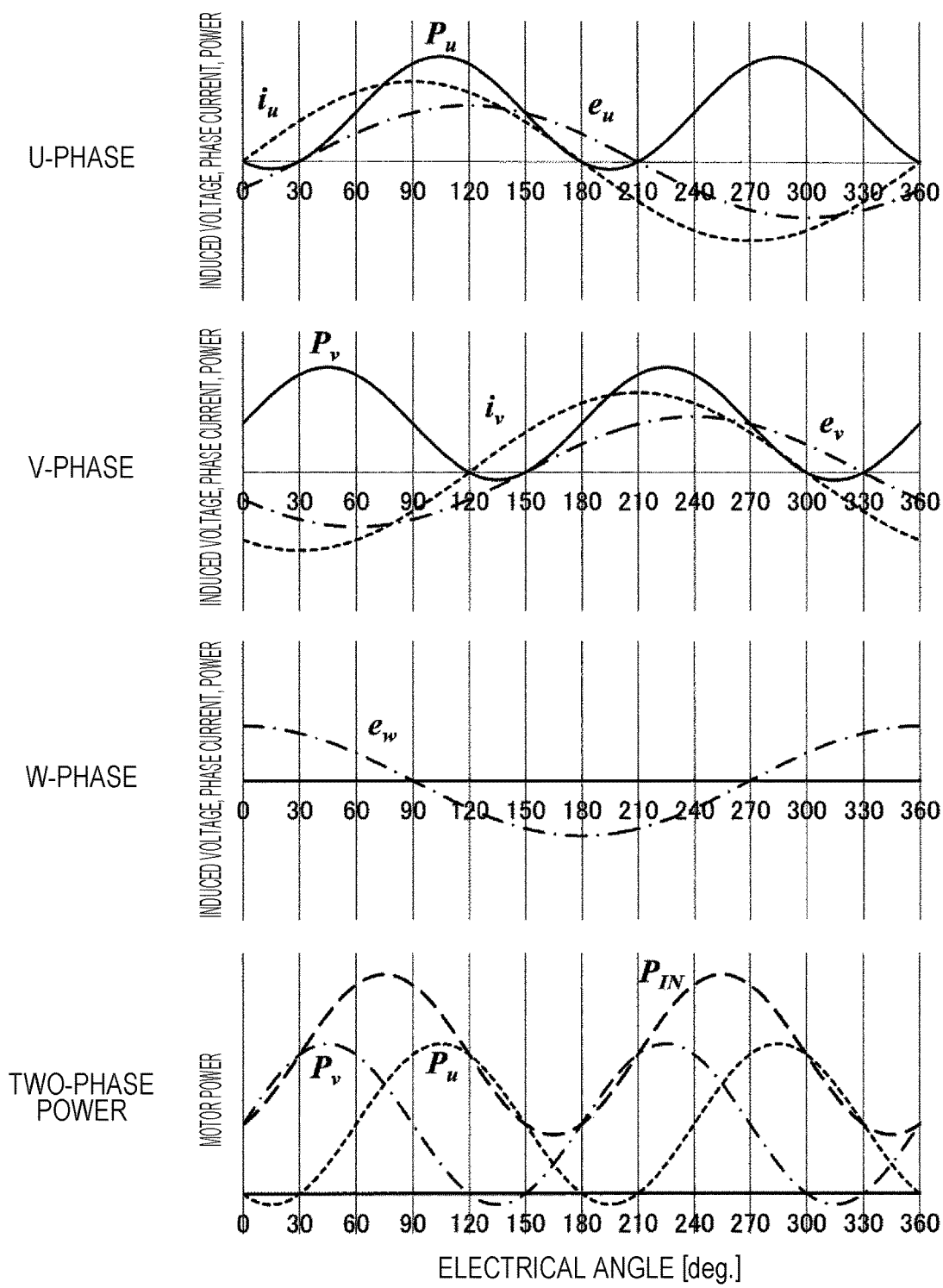
FIG. 8 is a diagram illustrating each waveform example of the induced voltage, the current, and the power of each phase in the motor in a case in which phase adjustment of current is not performed when a W-phase is lost.

A description will be given in detail regarding an example of torque pulsation in the above-described open-phase state with reference to FIG. 8. FIG. 8 is a diagram illustrating each waveform example of the induced voltage, the current, and the power of each phase in the motor 100 in a case in which phase adjustment of current is not performed when the W-phase is lost. In this case, each phase difference between the U-phase current $i_u$ and the V-phase current $i_v$ is still 120° as illustrated in FIG. 8, which is similar to that in the normal state. However, the current $i_w$ and the power $P_w$ of the W-phase become zero since the W-phase is in the open-phase state. Thus, the input power $P_{IN}$, which is the sum of the powers $P_u$, $P_v$ and $P_w$ (where $P_w$=0) of the three phases, is not constant as illustrated in FIG. 8, and pulsates at a frequency, which is twice of that of the induced voltage, along with each pulsation of the U-phase power $P_u$ and the V-phase power $P_v$.

As described above, when any phase is lost and incapable of being energized, the significant pulsation occurs in an output torque of the motor if the motor control is performed using the same control method at the normal state. Thus, it is necessary to stop the rotation of the motor when any phase is lost in the AC power, which is output to the motor, in a conventional motor drive device.

Meanwhile, the motor drive device 200 according to the present invention adjusts the phase difference of the current flowing in the armature winding of the normal phase such that the respective AC powers of the other normal phases, except for the open phase, offset each other by the controller 203 in a case in which any phase is lost in the AC power output to the motor 100. Accordingly, it is possible to reduce the pulsation of the output torque in the motor 100 and to continue the rotation of the motor 100.

Figure 9:
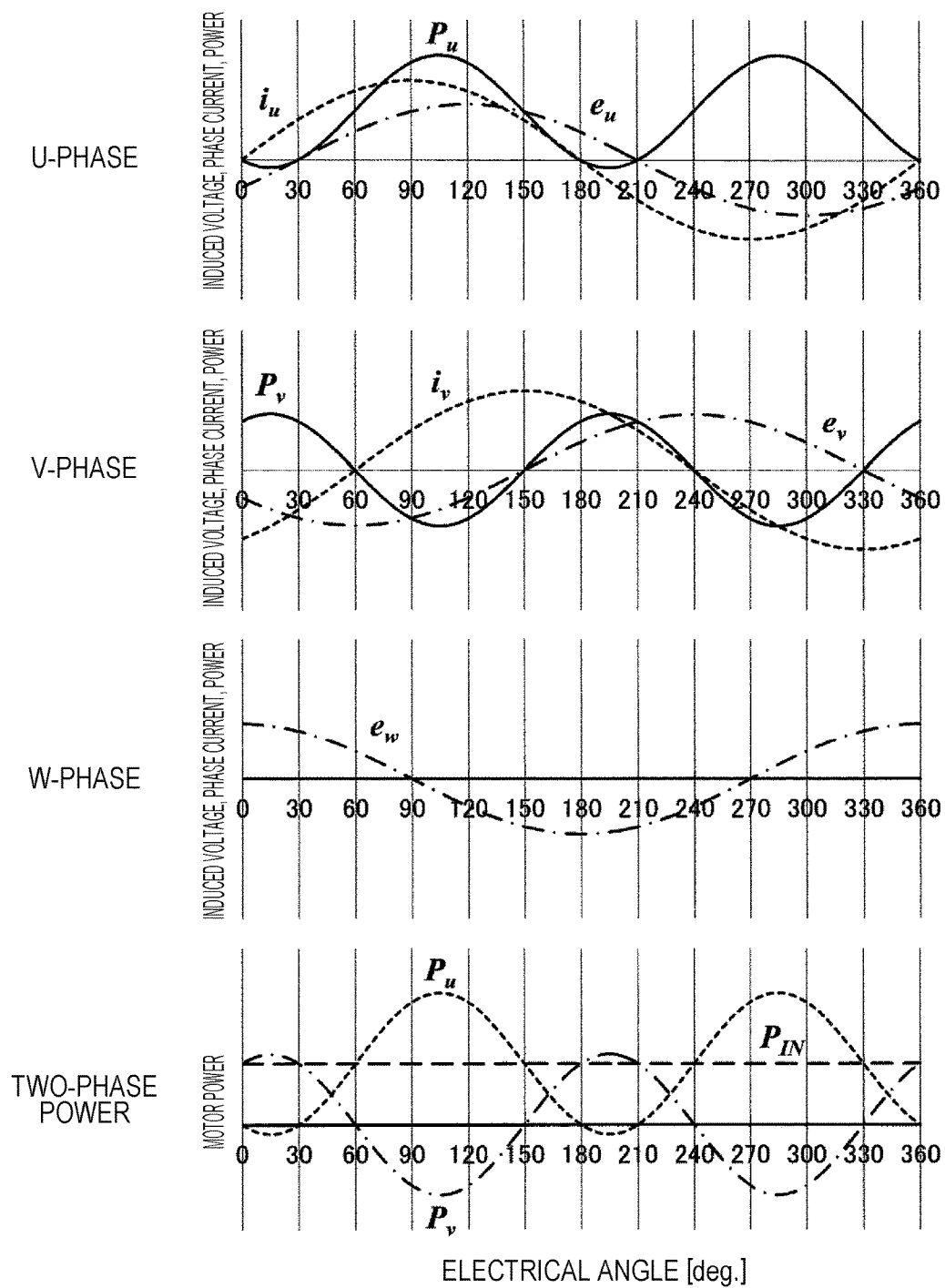
FIG. 9 is a diagram illustrating each waveform example of the induced voltage, the current, and the power of each phase in the motor in a case in which phase adjustment of current is performed when the W-phase is lost.

FIG. 9 is a diagram illustrating each waveform example of the induced voltage, the current, and the power of each phase in the motor 100 in a case in which phase adjustment of current is performed when the W-phase is lost. When the W-phase is lost, the motor drive device 200 shifts a phase of the V-phase current $i_v$ in a direction of decreasing 60° from the normal state (to the left in the drawing) to adjust each phase difference of the V-phase current $i_v$ and the U-phase current $i_u$ to be 60° as illustrated in FIG. 9. To be specific, the phase of the V-phase current $i_v$ to be output is adjusted in the current control operation performed by the controller 203, and the controller 203 outputs the drive signal Gv to the V-phase bridge circuit 210b in accordance with the adjusted phase. Accordingly, a mountain portion of the U-phase power $P_u$ and a valley portion of the V-phase power $P_v$, and a valley portion of the U-phase power $P_u$ and a mountain portion of the V-phase power $P_v$ are set to overlap each other and offset each other as illustrated in FIG. 9. As a result, it is possible to make the input power $P_{IN}$, which is the sum of the powers $P_u$, $P_v$ and $P_w$ of the three phases, constant as illustrated in FIG. 9 even when the W-phase is lost. Thus, it is possible to continue the rotation of the motor 100 while suppressing the torque pulsation.

Incidentally, the reduction of torque pulsation through the current phase adjustment in the open-phase state as described above can be applied to an independent winding multi-phase motor other than the three-phase motor. That is, when the number of phases of the motor serving as a control target is set to n and the number of open phases is set to m, the motor drive device according to the present invention enables the respective AC powers of the normal phases to offset each other by adjusting each current of the normal phases such that a phase difference Dp(°) between the respective AC powers of the normal phases satisfy the following Formula (8) when any phase is lost. As a result, it is possible to continue the rotation of the motor by suppressing the pulsation of the output torque of the motor.

$$Dp=360/2(n-m) \qquad (8),$$

where n and m are positive integers, and n≥m+2.

Each phase difference Di (°) of the currents flowing in the armature windings of the normal phases may be adjusted to satisfy the following Formula (9) in order to satisfy the above-described Formula (8). Accordingly, it is possible to cause the respective AC powers of the normal phases to offset each other when the open phase is caused in any phase, and to suppress the pulsation of the output torque of the motor.

$$Di=360/(n-m)-360/n \qquad (9)$$

Incidentally, Dp=90° and Di=60° when n=3 and m=1 in the above-described Formulae (8) and (9), which matches each of the relation between the U-phase power $P_u$ and the V-phase power $P_v$ and the relation between the U-phase current $i_u$ and the V-phase current $i_v$ illustrated in FIG. 9.

The motor drive device needs to be provided with an inverter circuit, which includes n bridge circuits in response to the number n of phases of the motor serving as the control target, and a controller which outputs the drive signal to each bridge circuit of the inverter circuit in order to realize the above-described current control. Meanwhile, the motor driven by the motor drive device needs to include n independent windings, which can be controlled to be independent from each other, and the current flowing in each independent winding is controlled by the motor drive device. When the present invention is applied in the combination of the motor drive device and the motor described above, it is possible to adjust each phase difference of the current flowing in the armature windings of the normal phases such that the respective AC powers of the other normal phases, except for the open phase, offset each other in a case in which any phase is lost. As a result, it is possible to continue the rotation of the motor by suppressing the pulsation of the output torque of the motor and generating a rotating magnetic field that smoothly rotates in the armature winding of the motor.

Next, a description will be given in more details regarding the operation of the motor drive device 200 during the current phase adjustment in the open-phase state described above.

It is considered a case in which a current does not flow in the W-phase armature winding 102c and an open phase occurs in the W-phase AC power as an operation abnormality is generated in the IGBT 221 or the diode 222 inside the W-phase bridge circuit 210c, for example, in the motor drive device 200 or disconnection is caused in the wiring inside the motor 100 or the AC output line 120. In this case, the motor drive device 200 can perform the current control using the remaining armature windings 102a and 102b of the two normal phases. However, the significant pulsation occurs in the input power $P_{IN}$ which is the sum of the U-phase instantaneous power $P_u$ and the V-phase instantaneous power $P_v$, as described with reference to FIG. 8, when the motor 100 is driven by outputting the respective phase currents with each phase difference of 120 degrees even in the open-phase state similarly to the state in which the normal three phases are equilibrated. As a result, a significant torque pulsation occurs in the motor 100.

Thus, the motor drive device 200 adjusts phases of the instantaneous powers $P_u$ and $P_v$ of the two normal phases, as described above, using the characteristic that it is possible to independently control each current flowing the armature windings 102a, 102b and 102c of the respective phases of the motor 100 to cause the mountain and valley portions thereof to be offset by each other. At this time, the motor drive device 200 seeks each phase of induced voltages of the respective phases based on the magnetic pole position information output from the magnetic pole position detector 110, attached to the output shaft 105 of the motor 100 and performs the current control operation with respect to the induced voltage in order to individually control each current phase of the respective phases using the controller 203. Accordingly, the phase difference between the instantaneous powers $P_u$ and $P_v$ is adjusted, and the torque pulsation of the motor 100 is reduced.

The above-described current control operation is performed using current value information, output from the AC sensors 130 of the respective phases attached between the motor drive device 200 and the motor 100, and the magnetic pole position information output from the magnetic pole position detector 110 attached to the output shaft 105 of the motor 100. The controller 203 outputs the drive signals Gu, Gv and Gw to the IGBTs 221 included in the respective bridge circuits 210a, 210b and 210c of the inverter circuit 210 according to a result of the current control operation. It is possible to individually adjust the induced voltages of the respective phases as the bridge circuits 210a, 210b and 210c of the respective phases performs the switching operation according to the drive signals Gu, Gv and Gw.

Figure 10:
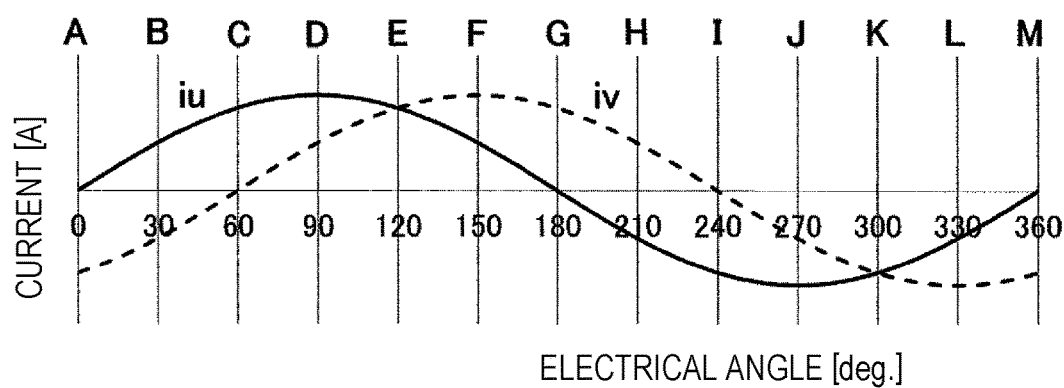
FIG. 10 is a diagram illustrating each waveform of a U-phase current and a V-phase current after phase adjustment when the W-phase is lost.
Figure 11:
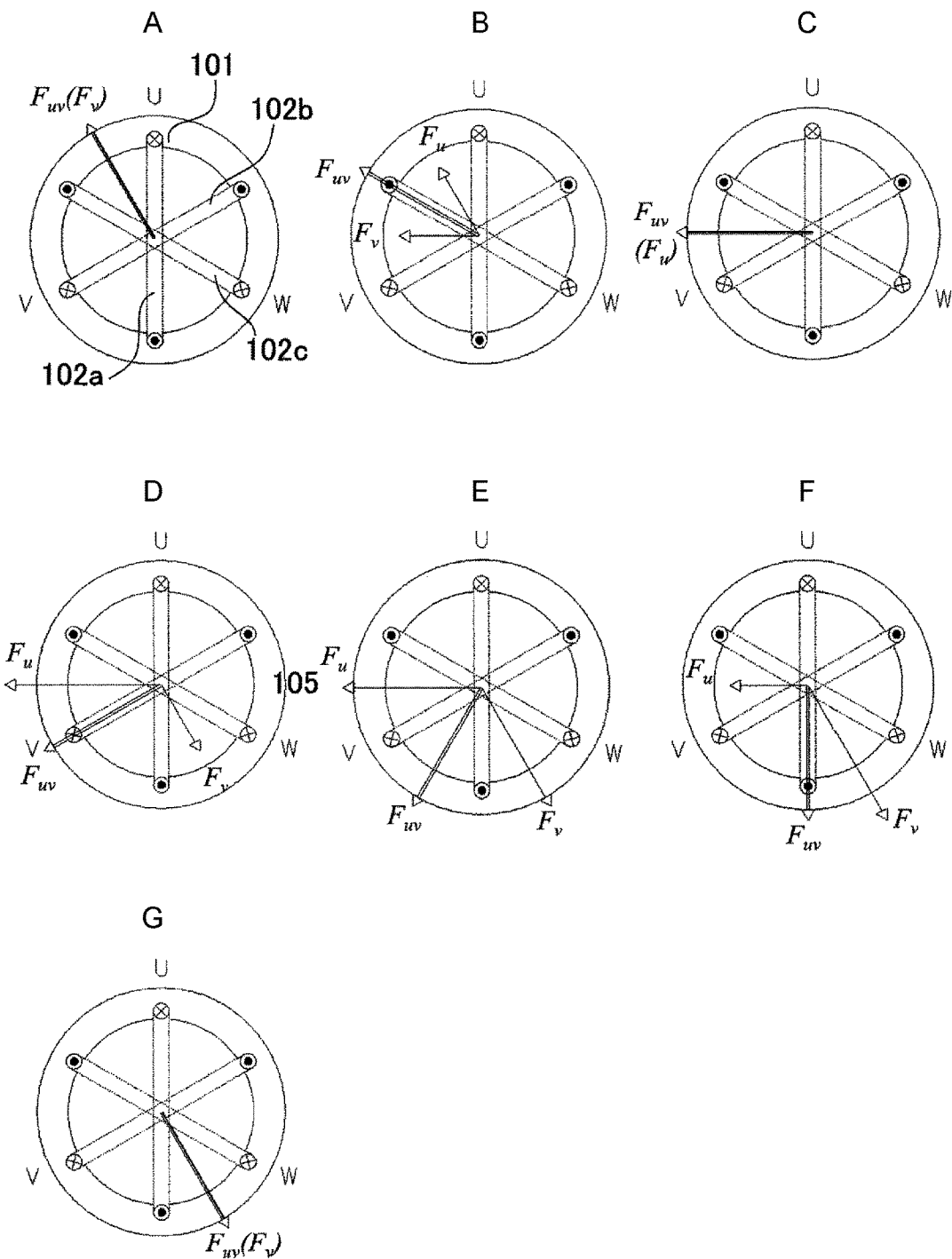
FIG. 11 is a diagram illustrating a magnetomotive force vector inside the motor corresponding to each electrical angle of A to G illustrated in FIG. 10.

Next, a description will be given regarding the rotating magnetic field generating inside the motor 100 in the case of performing the current phase adjustment in the open-phase state. FIG. 10 is a diagram illustrating each waveform of a U-phase current $i_u$ and a V-phase current $i_v$ after phase adjustment when the W-phase is lost. FIG. 11 is a diagram illustrating a magnetomotive force vector inside the motor 100 corresponding to each electrical angle of A to G illustrated in FIG. 10.

The current phase adjustment is performed such that the phase of the V-phase current $i_v$ is shifted by 60° with respect to the U-phase current $i_u$ when the W-phase is lost as illustrated in FIG. 10, and then, the rotating magnetic field caused by the magnetomotive force vector illustrated in FIG. 11 is generated inside the motor 100. At this time, the U-phase armature winding 102a and the V-phase armature winding 102b generate each magnetomotive force alternating depending on a change of current in a direction perpendicular to each armature winding.

When the electrical angle is 0° illustrated by A of FIG. 10, the U-phase current $i_u$ is zero, and only the V-phase current $i_v$ flows. At this time, a U-phase magnetomotive force $F_u$ becomes zero, and only a V-phase magnetomotive force $F_v$ is generated inside the motor 100 as illustrated in A of FIG. 11. Therefore, a combined magnetomotive force $F_{uv}$ generated by the U-phase armature winding 102a and the V-phase armature winding 102b is the same as the V-phase magnetomotive force $F_v$.

Next, when the electrical angle is 30° illustrated by B of FIG. 10, the current flows to both sides of the U-phase and the V-phase. At this time, the combined magnetomotive force $F_{uv}$ generated inside the motor 100 becomes a vector sum of the U-phase magnetomotive force $F_u$ and the V-phase magnetomotive force $F_v$ as illustrated by B of FIG. 11. In this manner, when a current value is changed by the electrical angle of 30° from A to B in the current waveform of FIG. 10, the magnetomotive force inside the motor 100 changes from A to B of FIG. 11. When A and B of FIG. 11 are compared, it is understood that each magnitude of the U-phase magnetomotive force $F_u$ and the V-phase magnetomotive force $F_v$ changes while the combined magnetomotive force $F_{uv}$ thereof rotates by 30° in a counter-clockwise manner with the same magnitude.

Similarly, magnetomotive forces of the motor 100 are illustrated by C to G of FIG. 11 corresponding to current values, shifted each by 30°, illustrated by C to G in FIG. 10. From FIG. 11, it is understood that the combined magnetomotive force $F_{uv}$ of the U-phase and the V-phase rotates in a counter-clockwise manner with a constant magnitude along with a change in the U-phase current $i_u$ and the V-phase current $i_v$ as illustrated in FIG. 10. That is, it is understood that the rotating magnetic field with a constant magnitude is generated inside the motor 100.

Incidentally, FIG. 11 does not illustrate magnetomotive force vectors generated at each electrical angle in a range of 210° to 360° illustrated by H to M of FIG. 10. However, each value of the U-phase current $i_u$ and the V-phase current $i_v$ is the same that is obtained by inverting a sign of each value at each electrical angle illustrated by B to G of FIG. 10. Therefore, it is understood that the combined magnetomotive force $F_{uv}$ of the U-phase and the V-phase also rotates in a counter-clockwise manner with the same magnitude at these electrical angles similarly to the above description.

Although the description has been given in FIG. 11 by exemplifying a bipolar motor in which the electrical angle and a mechanical angle matches each other, it is possible to generate a magnetic field rotating in an armature winding along with a change in current value in the same manner even in a multipolar motor in which an electrical angle and a mechanical angle are different from each other.

As described above, the motor drive device 200 performs the current phase adjustment using the two remaining normal phases and drives the motor 100 when any phase is lost due to the operation abnormality in any of the bridge circuits 210a, 210b and 210c of the inverter circuit 210 or the disconnection in the wiring inside the motor 100 or the AC output line 120. As a result, it is possible to drive the motor 100 without causing the significant torque pulsation by generating the rotating magnetic field that smoothly rotates inside the motor 100.

According to the first embodiment of the present invention described above, the following operational effects are achieved.

(1) The motor drive device 200 is configured to control the drive of the motor 100 in which the armature windings 102a, 102b and 102c of the respective phases are provided to be independent from each other, and is provided with the inverter circuit 210, which converts the DC power supplied via the DC bus lines 201a and 201b into the three-phase AC power and outputs the converted power to each of the armature windings 102a, 102b and 102c of the respective phases, and the controller 203 configured to control the inverter circuit 210. Meanwhile, the controller 203 adjusts the phase difference of the current flowing in the armature winding of the normal phase such that the respective AC powers of the other normal phases, except for the open phase, offset each other in a case in which any phase is lost in the AC power output from the inverter circuit 210 in the motor drive device 200. Accordingly, it is possible to control the drive of the motor 100 while suppressing the pulsation of the drive torque generated by the motor 100 when any phase becomes the open phase during the drive of the motor 100.

(2) When any phase is lost in the AC power output from the inverter circuit 210, the controller 203 adjusts the phase difference of the current flowing in the armature winding of the normal phase such that the respective AC powers of the normal phases offset each other as the phase difference Dp(°) of each AC power of the normal phase satisfies Formula (8) described above assuming that the number of phases of the motor 100 is n and the number of open phases is m. Accordingly, it is possible to suppress the pulsation of the drive torque in the open-phase state and to continue the drive of the motor not only in the three-phase motor such as the motor 100 but also in various the independent winding multi-phase motors other than the three-phase motor.

(3) The controller 203 performs adjustment such that each phase difference Di (°) of the currents flowing in the armature windings of the normal phases satisfies the above-described Formula (9). Accordingly, it is possible to suitably adjust each phase difference of the currents flowing in the armature windings of the normal phases regardless of the number of phases of the motor and to reliably offset the respective AC powers of the normal phases.

Second Embodiment

A second embodiment of the present invention will be described hereinafter. In present embodiment, a description will be given regarding an example in which an AC power of any open phase is cut off when the open phase occurs in the AC power output from the inverter circuit 210 of the motor drive device 200 to the motor 100.

Incidentally, a configuration of the motor drive device 200 and a configuration of the motor 100 according to the present embodiment are the same as the configurations of FIG. 1 that has been described in the first embodiment. Therefore, a description will be given in the present embodiment with reference to the configuration illustrated in the configuration diagram of FIG. 1.

Figure 12:
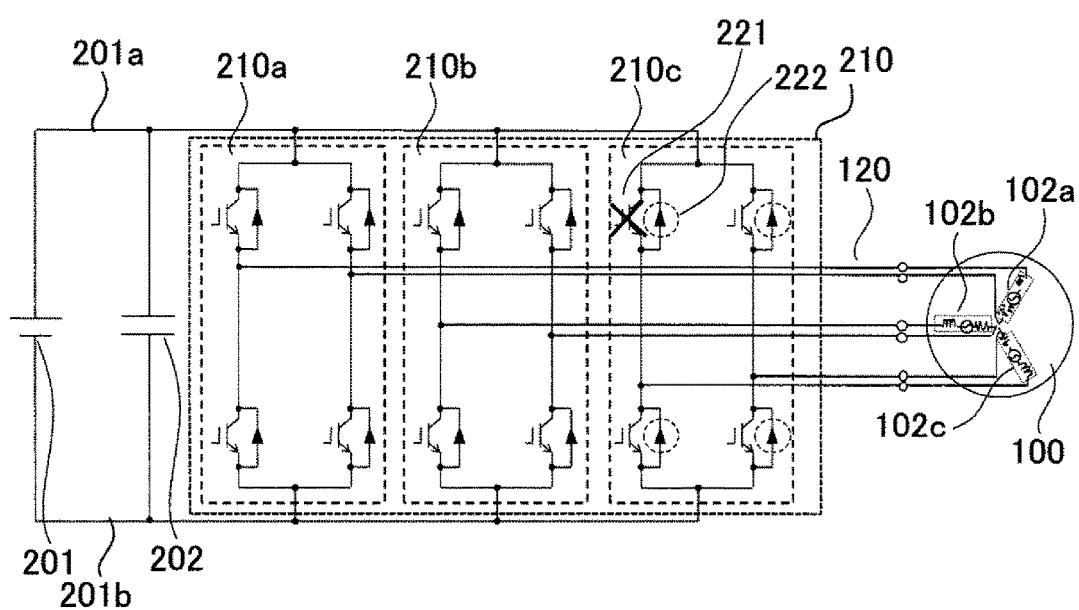
FIG. 12 is a diagram illustrating an aspect in which an off failure occurs in a W-phase bridge circuit of an inverter circuit in the motor drive device.

FIG. 12 is a diagram illustrating an aspect in which an off failure occurs in the W-phase bridge circuit 210c of the inverter circuit 210 in the motor drive device 200. For example, as illustrated in FIG. 12, it is assumed a case in which a failure in which one of the IGBTs 221 is constantly in an OFF state without any change occurs in the W-phase bridge circuit 210c. In this case, the bridge circuit 210c performs the same operation as that in a full-wave rectifier circuit.

Figure 13:
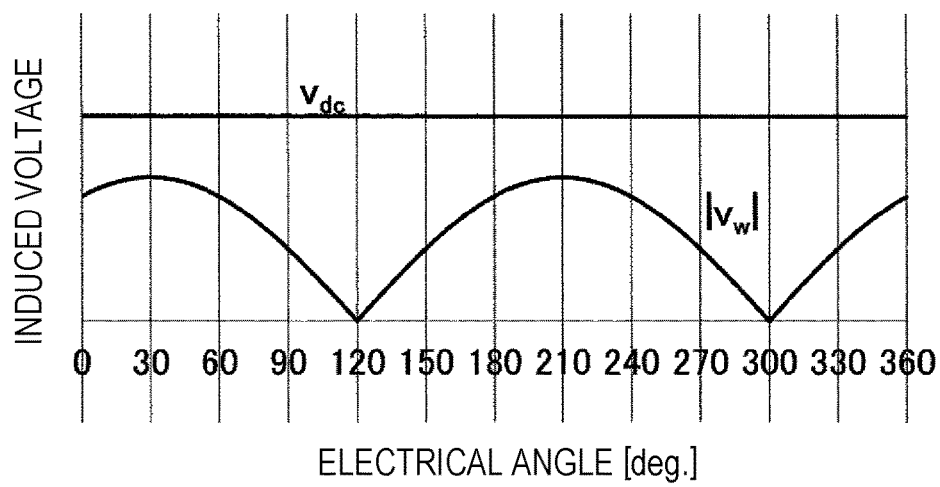
FIG. 13 is a diagram illustrating a DC voltage and a W-phase induced voltage when rotational velocity of the motor is relatively low.

If an off failure occurs as illustrated in FIG. 12, a voltage |Vw|, which is obtained by rectifying a W-phase induced voltage is lower than a DC voltage Vdc supplied from the DC power supply 201 as illustrated in FIG. 13 when the rotational velocity of the motor 100 is relatively low. Thus, the current flowing from the motor 100 to the motor drive device 200 is not generated.

Figure 14:
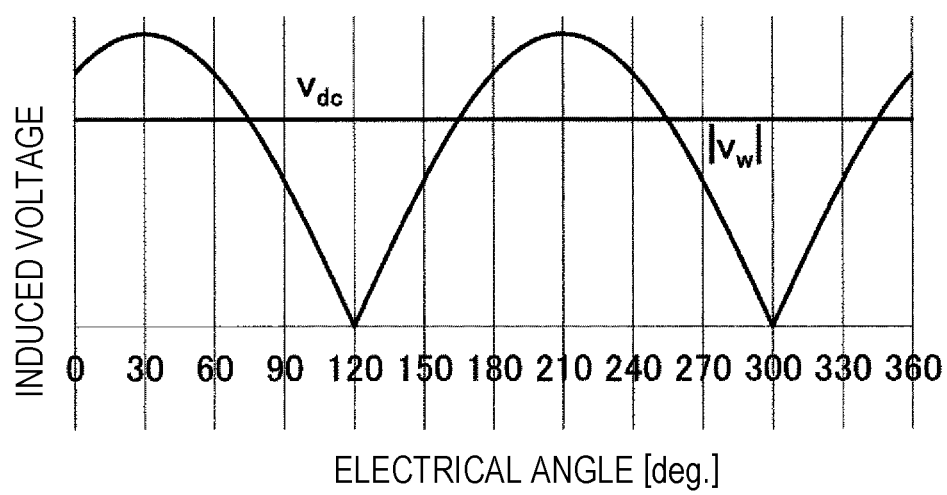
FIG. 14 is a diagram illustrating the DC voltage and the W-phase induced voltage when the rotational velocity of the motor is a certain value or higher.
Figure 15:
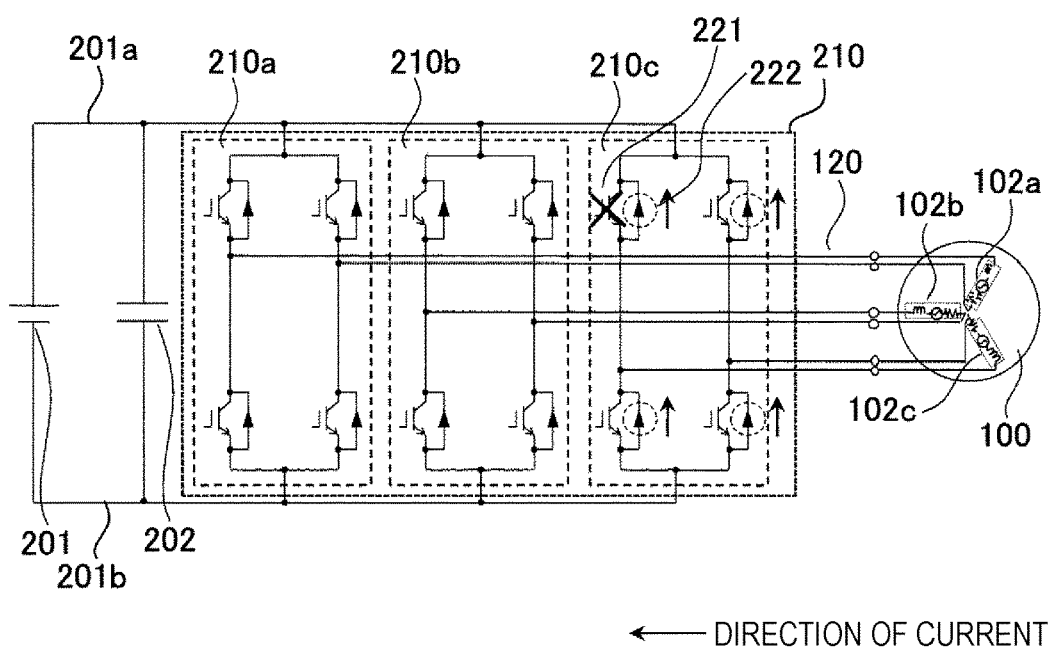
FIG. 15 is a diagram illustrating a current path in the W-phase bridge circuit during an off failure.

However, when the rotational velocity of the motor 100 is a certain value or higher, the voltage |Vw|, which is obtained by rectifying the W-phase induced voltage sometimes becomes higher than the DC voltage Vdc supplied from the DC power supply 201 as illustrated in FIG. 14. FIG. 15 is a diagram illustrating a current path in the W-phase bridge circuit 210c during the off failure. As illustrated in FIG. 15, a current flows from the motor 100 to the motor drive device 200 passing through the respective diodes 222 included in the W-phase bridge circuit 210c by the induced voltage generating in the W-phase armature winding 102c in the motor 100 during the off failure. This current causes a brake torque or torque pulsation in the motor 100. Therefore, it is necessary to disconnect the W-phase bridge circuit 210c having the failure from the motor 100 to prevent the flow of the current as illustrated in FIG. 15.

Figure 16:
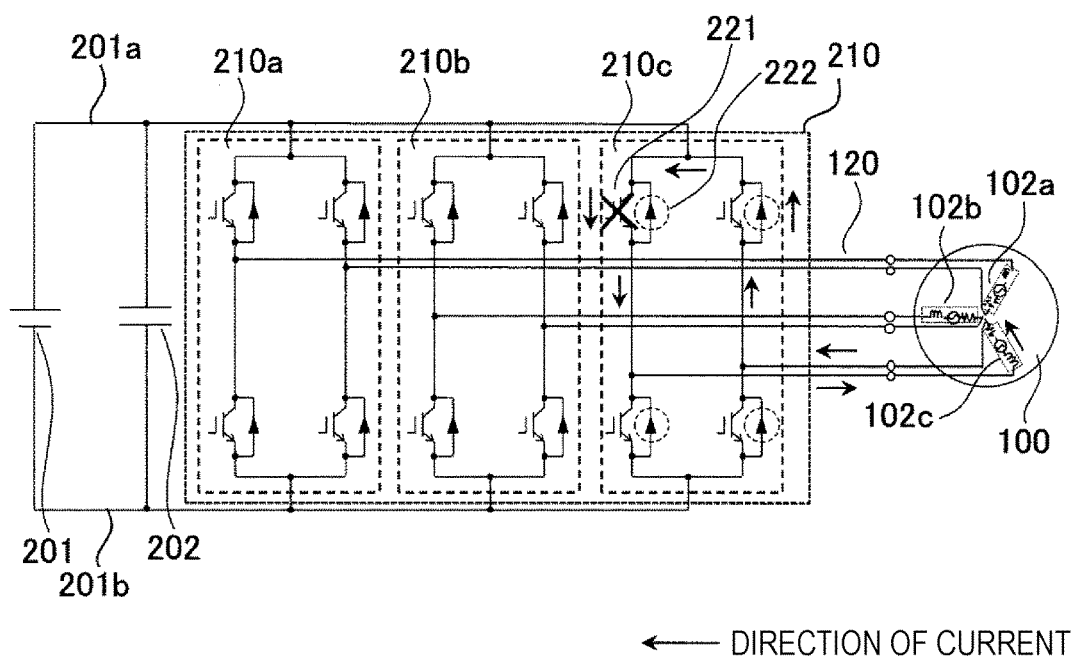
FIG. 16 is a diagram illustrating a current path when an on failure occurs in the W-phase bridge circuit of the inverter circuit in the motor drive device.

FIG. 16 is a diagram illustrating a current path when an on failure occurs in the W-phase bridge circuit 210c of the inverter circuit 210 in the motor drive device 200. For example, as illustrated in FIG. 16, it is assumed a case in which a failure in which one of the IGBTs 221 is constantly in the ON state without any change occurs in the W-phase bridge circuit 210c. In this case, the IGBT 221 is turned into a short-circuit state, and thus, a current circulating inside the W-phase bridge circuit 210c flows as illustrated in FIG. 16 by the induced voltage generated in the W-phase armature winding 102c in the motor 100. This current also causes the brake torque or the torque pulsation in the motor 100, which is similar to FIG. 15. Therefore, it is necessary to disconnect the W-phase bridge circuit 210c having the failure from the motor 100 to prevent the flow of the current as illustrated in FIG. 16.

Thus, a switch, which is configured to cut off power of a portion corresponding to an open phase when the open phase occurs in the AC power output from the inverter circuit 210, is provided inside the motor drive device 200 in the present embodiment. Accordingly, the current as described above is prevented from flowing even when any of the bridge circuits 210a, 210b and 210c has a failure in the inverter circuit 210. Details thereof will be described hereinafter.

Figure 17:
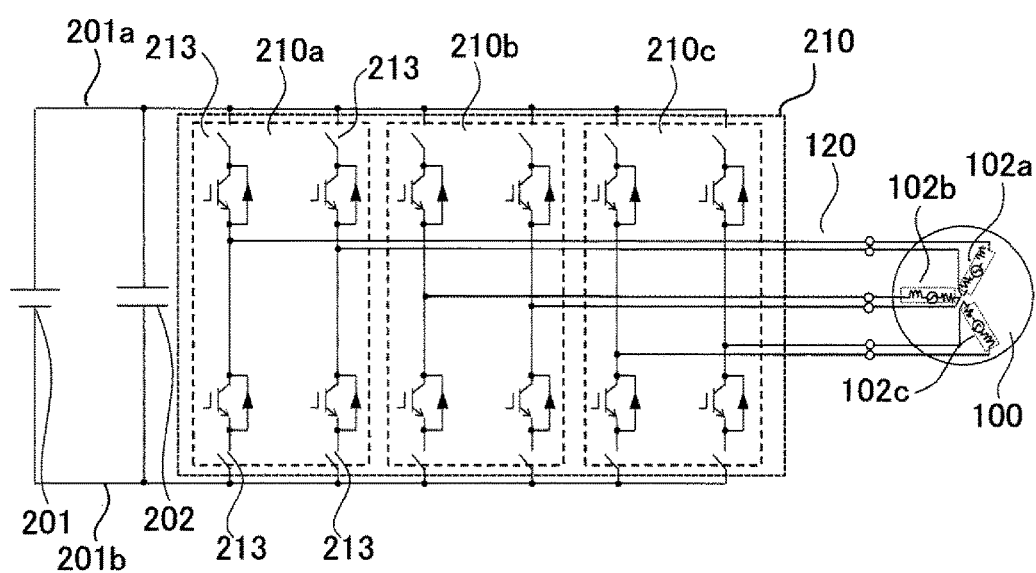
FIG. 17 is a diagram illustrating an example in which a power cut-off switch is provided in each bridge circuit of each phase.

FIG. 17 is a diagram illustrating an example in which a power cut-off switch 213 is provided in each of the bridge circuits 210a, 210b and 210c of the respective phase. When the above-described abnormality occurs in the motor drive device 200 or the motor 100 and any phase is lost in the AC power output from the inverter circuit 210, the motor drive device 200 turns the four switches 213, which are connected to a bridge circuit corresponding to the open phase among the bridge circuits 210a, 210b and 210c of the respective phases, into an open state according to an instruction of the controller 203 in FIG. 1 or other devices. Accordingly, the bridge circuit of a portion of the inverter circuit 210 corresponding to the open phase is disconnected from the DC bus lines 201a and 201b to cut off the AC power from the corresponding bridge circuit to the motor 100. As a result, it is possible to prevent an adverse impact from occurring in the drive of the motor 100 due to the current flowing in the circuit of the open-phase portion.

Figure 18:
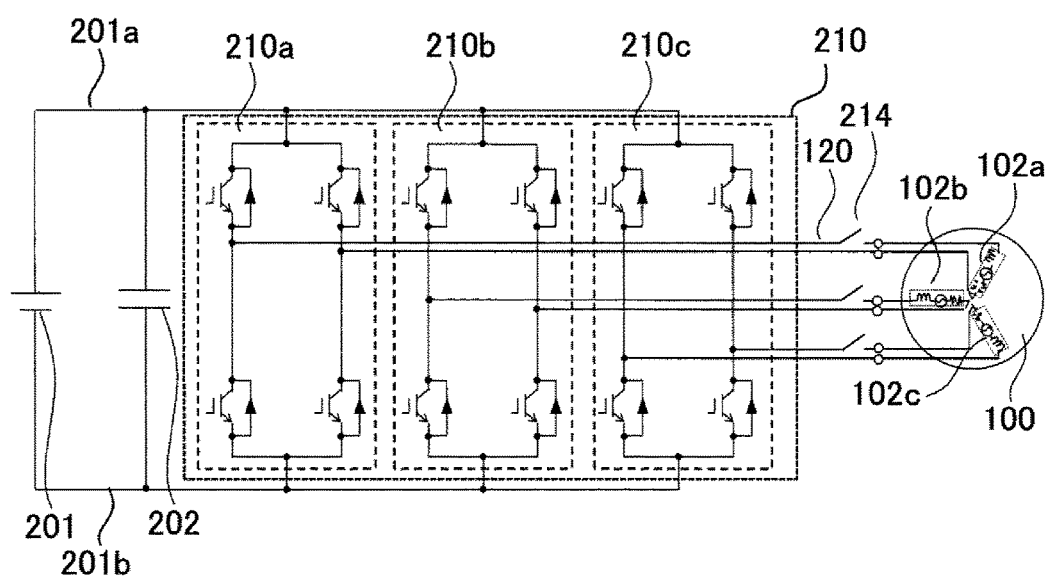
FIG. 18 is a diagram illustrating an example in which the power cut-off switch is provided in each AC output line of each phase.

FIG. 18 is a diagram illustrating an example in which a power cut-off switch 214 is provided in each of the AC output lines 120 of the respective phases. When the above-described abnormality occurs in the motor drive device 200 or the motor 100 and any phase is lost in the AC power output from the inverter circuit 210, the motor drive device 200 turns the switch 214, which is provided in the middle of the AC output line corresponding to the open phase among the AC output lines 120 of the respective phases, into an open state according to an instruction of the controller 203 in FIG. 1 or other devices. Accordingly, the armature winding corresponding to the open phase among the armature windings 102a, 102b and 102c of the respective phases is disconnected from the inverter circuit 210 to cut off the AC power from the inverter circuit 210 to the corresponding armature winding. As a result, it is possible to prevent the current from flowing to the circuit of the open-phase portion and to avoid the occurrence of the adverse impact in the drive of the motor 100.

According to the second embodiment of the present invention described above, the motor drive device 200 is further provided with the switch 213, which is configured to disconnect the portion of the inverter circuit 210 corresponding to the open phase from the DC bus lines 201a and 201b, or the switch 214 which is configured to disconnect the armature winding corresponding to the open phase among the armature windings 102a, 102b and 102c of the respective phases from the inverter circuit. Accordingly, when an open-phase occurs in the AC power output from the inverter circuit 210, it is possible to cut off the AC power of the open phase. Therefore, it is possible to prevent an adverse impact from occurring in the drive of the motor 100 due to the current flowing in the circuit of the open-phase portion.

Incidentally, the description has been given in the respective embodiments described above with by exemplifying the independent winding three-phase motor 100 capable of independently controlling each current flowing in the armature windings 102a, 102b and 102c of the respective phases, but the present invention can be applied to multi-phase motors other than the three-phase motor. That is, it is possible to adjust each phase difference of the current flowing in the armature winding of the normal phase such that the respective AC powers of the normal phases offset each other when any phase is lost in the AC power to be output from the inverter circuit to the motor by applying the present invention in any motor drive device that controls drive of an independent winding multi-phase motor that can independently control each current flowing in the armature windings of the respective phases. Accordingly, it is possible to reduce the pulsation of the output torque of the motor even in the open-phase state, and to generate the rotating magnetic field that smoothly rotates in the armature winding of the motor. As a result, it is possible to continue the drive of the motor.

In addition, the above respective embodiments and various modified examples have been described only as examples, and the present invention is not limited thereto as long as the characteristics of the invention are not compromised. The present invention is not limited to the above-described embodiments, and various modifications can be made within a range not departing from a gist of the present invention.

REFERENCE SIGNS LIST 100 motor
102a, 102b, 102c armature winding
110 magnetic pole position detector
120 AC output line
130 AC sensor
200 motor drive device
201 DC power source
201a, 201b DC bus line
202 smoothing capacitor
203 controller
210 inverter circuit
210a, 210b, 210c bridge circuit
221 IGBT
222 diode

The invention claimed is:

1. A motor drive device that controls drive of a multi-phase motor in which armature windings of respective phases are provided to be independent from each other, the motor drive device comprising:
an inverter circuit which converts a DC power supplied via a DC bus line into a multi-phase AC power and outputs the converted power to each of the armature windings of the respective phases; and
a controller configured to control the inverter circuit, wherein
when any open phase occurs in the AC power, the controller adjusts a phase difference of each current flowing in armature windings of normal phases such that respective AC powers of the normal phases other than the open phase offset each other, and
when any open phase occurs in the AC power, the controller adjusts a phase difference of each current flowing in the armature windings of normal phases such that respective AC powers of the normal phases offset each other by causing each phase difference Dp(°) of the respective AC powers of the normal phases to satisfy a following formula: Dp=360/2(n−m), assuming that a number of phases of the motor is n and a number of open phases is m, wherein n and m are positive integers and n≥m+2.

2. The motor drive device according to claim 1, wherein the motor is a three-phase motor in which three-phase armature windings are provided to be independent from each other, and
when any open phase occurs in the AC power, the controller adjusts each phase difference of each current flowing in armature windings of two normal phases such that respective AC powers of the two normal phases other than the open phase offset each other.

3. The motor drive device according to claim 1, wherein n=3, and m=1.

4. The motor drive device according to claim 1, further comprising
a first switch which is configured to disconnect a portion of the inverter circuit corresponding to the open phase from the DC bus line.

5. The motor drive device according to claim 1, further comprising
a second switch which is configured to disconnect an armature winding corresponding to the open phase from the inverter circuit.

6. The motor drive device according to claim 1, wherein the inverter circuit includes three full-bridge type bridge circuits which respond to a U-phase, V-phase, and the W-phase, respectively, each of the bridge circuits including four IGBTs switching elements of respective upper and lower arms, and four diodes provided in parallel with the respective IGBTs.

* * * * *